June 27, 1933. O. W. HEISE 1,915,608
GAUGE PROTECTING DEVICE
Filed Feb. 2, 1929
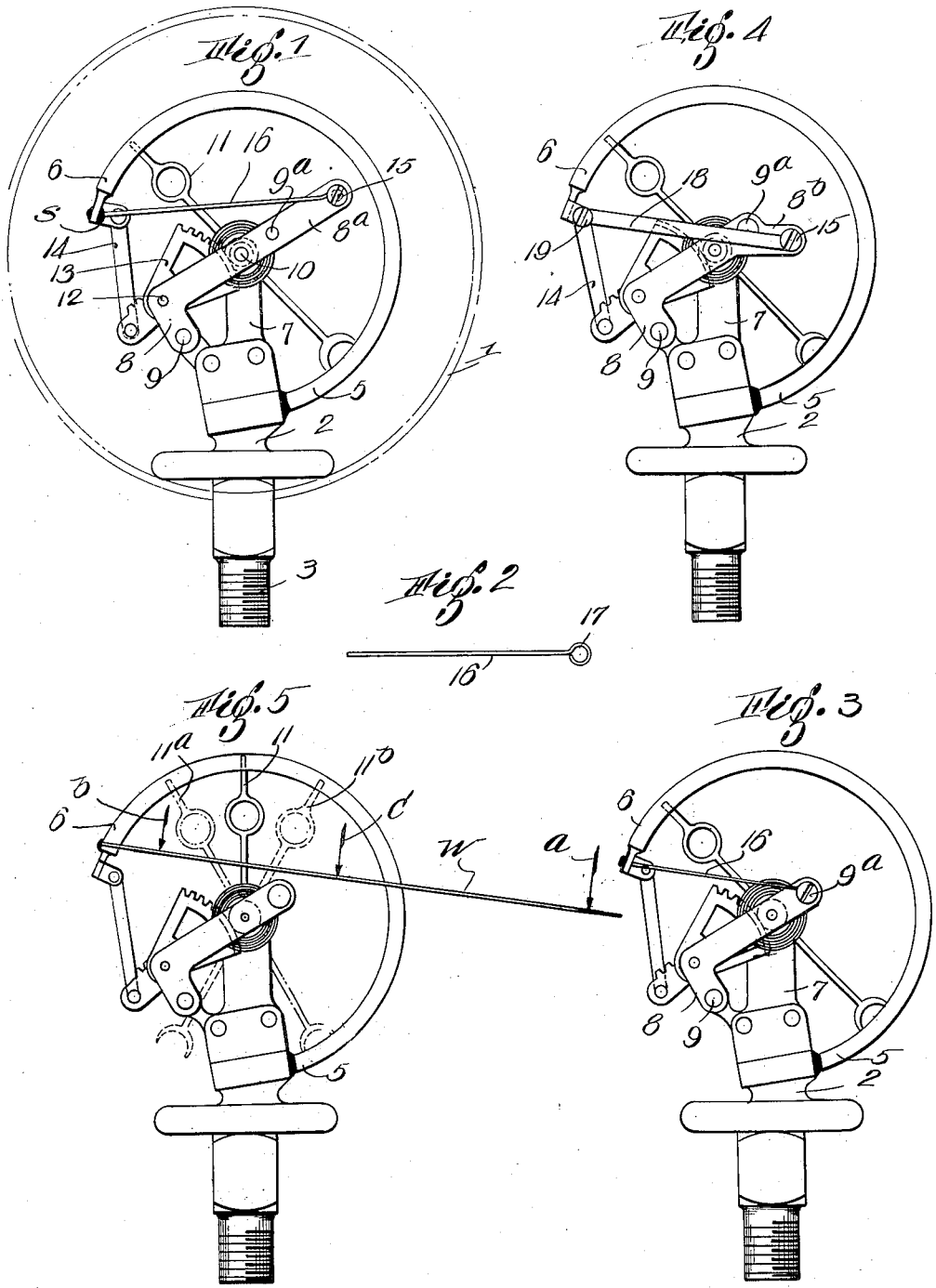
Inventor
Otto W. Heise.
By Roberts Cushman Woodberry
his Attorneys.

Patented June 27, 1933

1,915,608

UNITED STATES PATENT OFFICE

OTTO W. HEISE, OF BRIDGEPORT, CONNECTICUT, ASSIGNOR TO CONSOLIDATED ASHCROFT HANCOCK COMPANY, OF NEW YORK, N. Y., A CORPORATION OF DELAWARE

GAUGE PROTECTING DEVICE

Application filed February 2, 1929. Serial No. 337,157.

This invention pertains to gauges and relates more particularly to protecting means for guarding the gauge mechanism from injury or displacement as the result of shocks or blows. In my Patent No. 1,485,412 dated March 4, 1924, I pointed out the liability to injury of usual gauge mechanisms, particularly gauge mechanism of the Bourdon tube type, and disclosed practical and successful means for protecting such a gauge from injury.

In designing a successful gauge protective device which is to remain a permanent part of the gauge structure, it is essential to avoid any construction which will interfere with the normal movement of the end of the Bourdon tube in response to pressure changes, while on the other hand any substantial movement of the end of the tube inwardly or outwardly relative to the center of the gauge must be prevented to avoid permanent distortion of the tube.

In the course of a series of experiments upon Bourdon tube gauges with the general object of improving such gauges, I have discovered that within the normal range of pressure, the end of the tube moves in an approximately circular arc whose center is at a finite distance from such end and usually within the circumference of the tube itself, the exact position of such center in any particular case depending upon various factors, for example, the size of the tube and the thickness and hardness of the material of which it is made.

Taking advantage of this above noted discovery, that is to say, the fact that the end of the tube moves in an arc about a substantially definite center, I have now devised a gauge protective device of even simpler and more effective form than is shown in my aforesaid patent. This new protective device in its essentials consists merely of a link extending from the free end of the tube to a fixed support substantially at the center of the normal arc of movement of such end. Since, during such normal arcuate movement of the tube end, its radial distance from the center of arc does not substantially vary, a link thus arranged does not interfere in any way with the normal movements of the tube, although preventing any substantial movement of the tube in a direction radial to said center. The link which I employ is preferably of a fixed radial length (although I contemplate that its length may be adjustable), and while the link may be pivotally connected to the tube, I prefer to pivot it merely at the center of arc and to unite it fixedly to the tube. Preferably this link consists of a simple length of stiff wire soldered or otherwise fixedly secured at one end to the tube and having an eye at its other end through which passes a fixed pivot pin. Alternatively, the link may consist of a relatively heavier bar, produced in any desired way, but I prefer the simple wire for several reasons, principally for ease and cheapness of manufacture, although the wire link has a further advantage in that if, after installation of the gauge in its place of use, it should be desired to dispense with the protective device, such wire may easily be cut out without disturbing the setting of the gauge movement.

In the accompanying drawing:

Fig. 1 is a more or less diagrammatic rear elevation of a Bourdon tube gauge of conventional type equipped with a preferred form of my invention;

Fig. 2 is a detail elevation illustrating the protective link removed from the gauge;

Fig. 3 is a view similar to Fig. 2, but showing a slight modification in which the link is attached to the gauge movement frame at a point slightly removed from the true center of arc of the tube end;

Fig. 4 is an elevation illustrating a further modification in which a bar takes the place of the wire link of Fig. 1; and Fig. 5 is a diagrammatic view illustrating the principle of operation of my protective device.

Referring to the drawing the outline of the gauge casing is indicated in broken lines at 1. This casing is secured in usual manner to brackets projecting from the base frame 2 having the screw threaded nipple 3 which projects out through an opening in the casing. The frame 2 supports the Bourdon tube which is fixedly attached at its end 5 to the frame and which extends in a more or less circular curve from this point to its closed free end 6.

The base frame 2 also supports the movement frame which may in usual manner comprise the front member 7 and the rear member 8 held in fixed spaced apart relation by the shouldered posts 9 and 9ª. The parts 7 and 8 are provided with aligned journal openings for the index staff 10 carrying the index needle 11, and for the sector staff 12 carrying the toothed sector 13 which engages a pinion on the index staff. The outer end of the sector 13 is connected in usual manner by means of a link 14 to the free end 6 of the Bourdon tube. The mechanism thus far described is of common and usual type and when pressure is admitted to the interior of the Bourdon tube the latter tends to straighten and thus through the link 14 and other parts of the gauge movement to turn the index 11 and thereby indicate the increase in pressure.

As pointed out in my patent above referred to, gauges of this type are particularly subject to injury through shocks or blows, since the Bourdon tube is necessarily of relatively thin material which offers little resistance to permanent deformation. Thus, when such a gauge is subjected to blows, there is a tendency for the free end of the tube to assume an abnormal position due to permanent distortion of the metal, which throws the gauge out of adjustment so that recalibration is necessary.

Referring to Fig. 5, I have noted in experimenting in gauges of this type that if a stiff member W, for example a piece of stiff wire, be soldered or otherwise fixedly secured adjacent to the free end 6 of the tube, such wire extending chord-wise of the tube, that pressure applied in the direction of the arrow $a$ will cause the index to move toward the dotted position 11ª, whereas pressure applied as indicated by the arrow $b$ will cause the index to move toward the position 11ᵇ. Intermediate these points there is a position where pressure, acting as indicated by the arrow $c$ has substantially no effect upon the index needle. It is thus apparent that at some point approximating the position of the arrow $c$ there is a center in space about which the end of the tube 6 moves in an arcuate and apparently substantially circular path. Thus by connecting the free end of the tube by a rigid and inextensible member to a fixed anchorage at this center, any radial movement of the free end of the tube toward and from such center is effectively prevented, although the normal movement of the tube end along its arcuate path is not substantially interfered with.

In applying this principle, as shown at 8ª in Fig. 1, for example, I have extended the rear member 8 of the movement frame to a point approximating the predetermined center of arc of movement of the free end of the tube, and at this point I have provided a fixed anchorage member 15, preferably in the form of a pivot pin or screw. I also provide a link member 16 (Fig. 2), preferably consisting of a length of stiff wire provided at one end with an eye 17 adapted to receive the fixed pivot pin 15 and to turn freely upon the latter. In this preferred form the other end of the link 16 is fixedly secured to the Bourdon tube at a point adjacent to the free end 6 of the latter. Conveniently, solder S may be used in thus attaching the link to the tube, although I contemplate that other attaching means may be employed. Furthermore, while the end of the link may be attached directly to the end of the tube or to the usual short bracket carried by the tube and to which the end of the link 14 is secured, I contemplate that it may be attached to the tube in other ways and by the interposition of other connecting elements if desired.

This very simple form of link, by its rigidity opposes any inward radial movement of the end of the tube toward the center at the point 15 and through its inextensible character prevents any outward movement of the end of the tube away from said center. At the same time it does not interfere with normal movements of the tube in response to pressure variations. The link thus devised forms a very effective guard to prevent injuries to the gauge, and a gauge thus equipped may be subjected to heavier blows and rougher usage than might be expected during transportation and use without showing any injury from permanent distortion of the tube. If, after such a tube has been installed in place it be desired to dispense with the protecting device (which is of especial utility during transportation and installation) the wire link 16 may readily be cut out without affecting the setting of the gauge.

In Fig. 4 I have shown a slight modification in which the rear member 8 of the gauge movement has an offset extension at 8ᵇ reaching to the center of arc of movement of the tube (such center in this case being at a different position from that indicated in Fig. 1). In this instance the link 18 which connects the end of the tube to this center is formed from sheet metal or other suitable material having somewhat greater transverse dimensions than the wire link of Fig. 2 and the link is pivoted at one end upon the pivot pin 15 and at its other upon the pin 19 which connects the link 14 to the end of the tube.

In Fig. 3 I have shown in still further modification wherein the link 16, which may be of either of the type shown in Figs. 1 or 4, is pivoted upon a rearward extension of the post 9ª of the movement frame. In this case, the center about which the link swings but roughly approximates the true center of arc and with this arrangement there may be some slight, although usually inappreciable, modification of the normal movement of the tube under pressure variations. While this arrangement may, under some circumstances, be desirable, I prefer arrangements such as shown in Figs. 1 and 4 where the link extends from the end of the tube to a point which very closely approximates the true center of arc.

While I prefer a rigid link such as above described, I contemplate that a more or less flexible link member, for example, a stiff coil spring, may be used, although such an arrangement would probably not provide the same measure of protection as the type of link herein disclosed.

While under most circumstances the center of arc appears to lie within the circumference of the Bourdon tube, I contemplate that under some circumstances it may fall outside of such circumference, and that the fixed anchorage may then, if desired, be provided by means secured to the gauge casing or in any other suitable manner.

I claim:

1. A gauge of the kind having a movable index, a Bourdon tube, a fixed support for one end of the tube, and means for transmitting normal movements of the free end of the tube to the index, the free end of the tube normally describing a substantially circular arc about a fixed center in response to pressure variations, a fixed anchorage disposed substantially at said fixed center of arc, and a substantially rigid member fixedly connected to the free end of the tube and extending chord-wise of the latter, and a pivotal support for said rigid member disposed substantially at said center of arc and carried by the anchorage, said rigid member being free to swing about its pivot in response to normal arcuate movement of the tube end, and offering no substantial resistance to such normal movement of the tube end.

2. A safety device for Bourdon tube gauges comprising a substantially inextensible and rigid link member fixedly secured to the Bourdon tube adjacent to the free end of the latter and extending chord-wise of the tube, and a pivot pin constituting a fixed anchorage for the link, said anchorage being disposed approximately at the center of arc of normal movement of the free end of the tube.

3. In combination with a gauge comprising a support, a gauge movement frame mounted thereon, a Bourdon tube attached at one end to the frame, the other end of the tube being free to move in the approximately circular arc which it normally follows in response to internal pressure variations, a fixed anchorage element supported by said frame at a point approximating the center of the arc of movement of the movable end of the tube, a protective device for preventing injury to the Bourdon tube while permitting normal free response of the latter to pressure variations, said protective device comprising a substantially inextensible link fixedly attached at one end to the movable end of the tube and at its other end having pivotal engagement with said anchorage element, said link being free to swing about its pivot point.

4. A gauge having a frame, a gauge movement supported thereby, a Bourdon tube secured at one end to the frame, the other end of the tube being free to move in the normal path which it tends to follow in response to internal pressure variations, said path being an approximately circular arc having a definite center, a fixed pivot element adjacent to said center, and a link extending chord-wise of the Bourdon tube and having one end pivotally engaging said fixed pivot element and having its other end fixedly attached to the movable end of the Bourdon tube.

5. A gauge having a frame, a gauge movement supported thereby, a Bourdon tube secured at one end to the frame, the other end of the tube moving in response to internal pressure variations, said latter end moving in an approximately circular arc about a definite center, a fixed pivot element adjacent to said center, and a substantially inextensible wire link having a loop at one end for the reception of the fixed pivot element and fixedly secured at its other end to the movable end of the Bourdon tube.

Signed by me at Bridgeport, Connecticut this 30th day of January 1929.

OTTO W. HEISE.